US007619399B2

(12) United States Patent
Cho et al.

(10) Patent No.: US 7,619,399 B2
(45) Date of Patent: Nov. 17, 2009

(54) APPARATUS TO GENERATE HIGH VOLTAGE USING DIGITAL CONTROL AND METHOD THEREOF

(75) Inventors: Jun-seok Cho, Gwangmyeong-si (KR); Young-min Chae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 11/407,031

(22) Filed: Apr. 20, 2006

(65) Prior Publication Data

US 2006/0238175 A1 Oct. 26, 2006

(30) Foreign Application Priority Data

Apr. 23, 2005 (KR) ...................... 10-2005-0033846

(51) Int. Cl.
*G05F 1/00* (2006.01)

(52) U.S. Cl. ....................... 323/283; 323/267; 323/322; 710/315; 399/88

(58) Field of Classification Search ................... 399/88; 363/21.02, 21.03, 21.05, 21.11, 21.04, 21.13; 323/283, 241, 300, 319, 322, 267; 710/315
See application file for complete search history.

(56) References Cited

U.S. PATENT DOCUMENTS 5,592,058 A * 1/1997 Archer et al. .......... 318/400.09
5,676,475 A * 10/1997 Dull ........................... 400/174
5,864,457 A * 1/1999 Kates et al. ................. 361/111
6,034,787 A * 3/2000 Hashimoto et al. ........... 358/1.9
6,157,093 A * 12/2000 Giannopoulos et al. ....... 307/38
6,400,127 B1 6/2002 Giannopoulos
6,603,498 B1 * 8/2003 Konnunaho et al. ......... 347/236
6,604,163 B1 * 8/2003 Duboc ........................ 710/306
2003/0137683 A1 * 7/2003 Mochizuki et al. ......... 358/1.13

(Continued)

FOREIGN PATENT DOCUMENTS

EP 0 657 988 6/1995

(Continued)

OTHER PUBLICATIONS

Chinese Office Action dated Mar. 28, 2008 issued in Chinese Application No. 200610074669.0.

(Continued)

*Primary Examiner*—Adolf Berhane
*Assistant Examiner*—Harry Behm
(74) *Attorney, Agent, or Firm*—Stanzione & Kim LLP

(57) ABSTRACT

An apparatus to generate a high voltage includes an outputting part having a power transforming part formed with a primary and a secondary coil, a switching part to control an output voltage induced in the secondary coil of the power transforming part, by interrupting a current in the primary coil of the power transforming part, a digital controlling part to control an interruption operation of the switching part according to a time constant determining a wave form of the output voltage of the power transforming part and a control reference value determining a level of the output voltage, and a digital interfacing part to convert input control data having first and second forms into the time constant and the control reference value, respectively, and to provide the time constant and the control reference value to the digital controlling part.

28 Claims, 5 Drawing Sheets

U.S. PATENT DOCUMENTS

| | | | | |
|---|---|---|---|---|
| 2004/0000897 | A1 * | 1/2004 | Asayama | 323/283 |
| 2004/0178780 | A1 * | 9/2004 | Chapuis | 323/282 |
| 2004/0255089 | A1 * | 12/2004 | Unno | 711/154 |

FOREIGN PATENT DOCUMENTS

| | | |
|---|---|---|
| EP | 1 209 810 | 5/2002 |
| GB | 2 377 094 | 12/2002 |
| JP | 01-260466 | 10/1989 |
| JP | 2002-174970 | 6/2002 |
| JP | 2002-357969 | 12/2002 |
| JP | 2002-357989 | 12/2002 |
| JP | 2004-037635 | 2/2004 |
| JP | 2004-101915 | 4/2004 |
| WO | WO 2005/011118 | 2/2005 |

OTHER PUBLICATIONS

European Search Report dated Jun. 26, 2007 issued in EP 06111945.9.

* cited by examiner

APPARATUS TO GENERATE HIGH VOLTAGE USING DIGITAL CONTROL AND METHOD THEREOF

CROSS-REFERENCE TO RELATED APPLICATIONS

This application claims the benefit under 35 U.S.C. § 119 (a) of Korean Patent Application No. 2005-33846, filed on Apr. 23, 2005, in the Korean Intellectual Property Office, the entire contents of which are incorporated herein by reference.

BACKGROUND OF THE INVENTION

1. Field of the Invention

The present general inventive concept relates to an apparatus to generate a high voltage and a method thereof. More particularly, the present general inventive concept relates to an apparatus to generate a high voltage using an Application Specific Integrated Circuit (ASIC) on a control part to perform a digital control method to control output stabilization and various output of the high voltage.

2. Description of the Related Art

An image forming apparatus prints an image corresponding to an original image data input on a recording medium such as a printing paper. The image forming apparatus includes a printer, a copy machine or a facsimile. An electrophotographic method is employed in the image forming apparatus, such as a laser beam printer, an LED Print Head (LPH) printer, and a facsimile. The image forming apparatus using the electro-photographic method performs printing through charge, exposure, development, transfer and fixation steps.

FIG. 1 schematically illustrates a conventional image forming apparatus using an electro-photographic method. Referring to FIG. 1, the image forming apparatus using the electro-photographic method includes a photoconductive drum 1, a charge roller 2, a Laser Scanning Unit (LSU) 3, a development roller 4, a transfer roller 5, a controlling part 6 and a High Voltage Power Supply (HVPS) 70.

The conventional image forming apparatus using the electro-photographic method performs printing steps as follows. The HVPS 70 supplies a predetermined voltage to the charge roller 2, the development roller 4, and the transfer roller 5 according to control by the controlling part 6. The charge roller 2 evenly electrifies a surface of the photoconductive drum 1 with a charge voltage supplied from a HVPS 70. The LSU 3 scans light (i.e., laser beam) corresponding to an image data input from the controlling part 6 to the photoconductive drum 1. Accordingly, an electrostatic latent image is formed on the surface of the photoconductive drum 1. A toner image is formed based on the electrostatic latent image formed on the surface of the photoconductive drum 1, using toner supplied by the development roller 4. The transfer roller 5 is driven by a transfer voltage supplied from the HVPS 70 and transfers the toner image formed on the photoconductive drum 1 to a recording medium, such as a printing paper. The toner image transferred to the printing paper is fixed on the printing paper by high heat and pressure of a fixer (not shown), and the printing paper is ejected outside the conventional image forming apparatus in an ejection direction (not shown).

As a key part of the image forming apparatus, such as a copy machine, a laser beam printer or a facsimile, the HVPS 70 supplies voltage by instantaneously converting a low voltage of 12~24V to a high voltage of hundreds or thousands volts and charging the drum of the image forming apparatus.

The HVPS 70 is used as a constant voltage or current source to provide a required voltage or current.

FIG. 2 is a circuit diagram illustrating a conventional HVPS. Referring to FIG. 2, the conventional HVPS includes a low pass filtering part 10, a voltage controlling part 20, an oscillator and power transforming part 30, a voltage dividing part 40, a voltage sensing part 50 and a protecting part 60. When the low pass filtering part 10 receives an input signal D(t) that is a PWM (Pulse Width Modulation) signal from an external engine controller, a level of an output voltage is decided according to a duty ratio of the input signal D(t), and the low pass filtering part 10 converts the input signal D(t) into a DC signal through an RC 2-step filter having resistors $R_1$, $R_2$, $R_{15}$, and capacitors $C_1$ and $C_{10}$. The DC signal is used as a reference signal to control the output voltage of the HVPS.

The voltage controlling part 20 is operated as a controller having a difference circuit $IC_1$ in parallel to a resistor $R_3$ and a capacitor $C_2$ to amplify an error signal, and compares the DC signal output by the low pass filtering part 10 with a signal having an actual voltage fed-back signal, to generate a driving signal of a transistor Q of the oscillator and power transforming part 30. The oscillator and power transforming part 30 controls a base current of the transistor Q based on the driving signal $V_{T1}$ output by the voltage controlling part 20 through the resistors $R_4$ and $R_5$ and a coil $N_1$, and voltages between an emitter connected between $R_4$ and $R_5$ through a capacitor $C_3$ and a collector of the transistor Q using a voltage $V_{cc}$. Accordingly, a voltage of a first (primary) coil $N_2$ of a voltage transforming part is determined and a second (output) voltage is induced in a second (secondary) coil $N_3$ of the voltage transforming part having a high turn ratio.

The voltage dividing part 40 uses diodes $D_1$ and $D_2$ to rectify the second voltage and capacitors $C_4$ and $C_5$ to distribute and smooth the rectified voltage, and generates a final DC high voltage from an AC voltage (i.e., the second voltage) induced in the second (secondary) coil $N_3$ of the oscillator and power transforming part 30. The voltage sensing part 50 includes the resistors $R_{16}$, $R_8$, and $R_7$ an integrated circuit $IC_2$ in parallel with an RC filter made of a resistor $R_{10}$ and a capacitor $C_7$. The voltage sensing part 50 is connected to the protecting part 60 through resistors $R_{11}$, and $R_{12}$ and capacitor $C_8$, and the protecting part 60 includes an integrated circuit $IC_2$, diodes $D_3$ and $D_4$, and resistors $R_{15}$, and $R_{13}$. The voltage sensing part 50 and the protecting part 60 detect the final DC high voltage, generate a feedback signal to the voltage controlling part 20 and prevent supplying an abnormal voltage.

The conventional HVPS illustrated in FIG. 2 is a circuit generating a high voltage to a development unit of one particular channel, and requires respective channels for supplying a predetermined high voltage to the charge roller 2, the development roller 4, and the transfer roller 5.

The conventional HVPS uses an analog control method for individually and precisely controlling an output of each channel, and accordingly errors caused by characteristic deflection between the low pass RC filter 10 and the voltage controlling part 20 should be corrected. The use of a number of components is a hindrance to cost-savings and the structure thereof may cause the conventional HVPS to erroneously operate, due to defective unit parts as a result of external factors. The transistor Q is used as a switching device in the oscillator and voltage transforming part 30 and always operates in a linear area, such that the transistor Q continuously generates heat. As illustrated in FIG. 2, the conventional HVPS uses many components, accordingly increasing manufacturing time and costs during an assembly process, requiring a large space in the Printed Circuit Board (PCB) for disposing the many components, and making it difficult to control the output voltage due to a fixed configuration of the components on the PCB.

SUMMARY OF THE INVENTION

The present general inventive concept provides an apparatus to generate a high voltage and a method thereof using an ASIC (Application Specific Integrated Circuit) chip to control the high voltage, and making it easy to control an output voltage by using a digital control method.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing an apparatus to generate a high voltage comprising a switching part to interrupt a current to be supplied to a primary coil of a power transforming part to control an output voltage to be induced to a secondary coil of the power transforming part, a digital controlling part to control the switching part according to a time constant determining a wave form of the output voltage of the power transforming part and a control reference value determining of the output voltage, and a digital interfacing part to convert input control data having first and second formats into the time constant and the control reference value, respectively, and to provide the control reference value and the time constant to the digital controlling part.

The data in a second format may comprise in PWM (Pulse Width Modulation) format, and the data in a first format may be transmitted through a serial communication interface.

The digital interfacing part may include the PWM unit to convert the input control data in the second format into the control reference value and to output the control reference value, a communication interface including the serial communication interface, a memory to store and output the time constant through the communication interface, and a demultiplexer to receive and transmit the input control data through either the PWM interface or the communication interface. The memory may include a volatile memory to store the time constant and a programmable non-volatile memory having the same memory map as the volatile memory to store the time cinstant. The switching part, the digital interfacing part, and the digital controlling part may be disposed in a single chip.

The digital controlling part may receive the output voltage of the power transforming part as a feedback signal and may modulate a cycle of the interruption operation of the switching part according to the feedback signal.

The serial communication interface may be any one of SPI (Serial Peripheral Interface), UART (Universal Asynchronous Receiver/Transmitter) and $I^2C$. The switching part may include a MOSFET (Metal Oxide Semiconductor Field Effect Transistor) as a switching device. The apparatus to generate a high voltage may be used in an image forming apparatus.

The foregoing and/or other aspects of the present general inventive concept may also be achieved by providing a method of generating a high voltage comprises converting input data having first and second formats into a time constant determining an output voltage of a power transforming part, and a control reference value determining a magnitude of the output voltage, respectively, controlling a switching operation of a predetermined switching device, according to the time constant and the control reference value, and modulating a voltage induced to a secondary coil of a power transforming part, by interrupting a current in a primary coil of the power transforming part, according to the switching operation. The method of generating high voltage may further comprise receiving the output voltage of the power transforming part as a feedback signal, and modulating a cycle of the switching operation according to the feedback signal.

The method may be performed in a single chip. The apparatus to generate a high voltage may be used by an image forming apparatus.

The foregoing and/or other aspects of the present general inventive concept may also be achieved by providing an ASIC (Application Specific Integrated Circuit) chip formed on a semiconductor substrate to control an outputting part to generate a high voltage and comprising a switching part to interrupt a current in a primary coil of a power transforming part to control an output voltage induced in a secondary coil of the connected transforming part, a digital controlling part to control an interruption operation of the switching part according to a time constant determining a wave form of the output voltage of the power transforming part and a control reference value determining a level of the output voltage, and a digital interfacing part to convert input data having first and second forms into the time constant and the control reference value, respectively, and to provide the time constant and the control reference value to the digital controlling part. The ASIC chip may further comprise a feedback circuit part to receive the output voltage of the power transforming part as a feedback signal and to modulate a cycle of the interruption operation of the switching part according to a comparison between the feedback signal and the control reference value.

The foregoing and/or other aspects of the present general inventive concept may also be achieved by providing an apparatus to generate a high voltage comprising a programming device to generate first data, a controlling part to generate second data, and a high voltage generating apparatus connected to the programming device and to the controlling part to generate a high voltage having a first character and a second character determined according to the first data and the second data, respectively.

BRIEF DESCRIPTION OF THE DRAWINGS

These and other aspects of the present general inventive concept will become more apparent and more readily appreciated from the following description of embodiments, taken in conjunction with the accompanying drawings of which.

DETAILED DESCRIPTION OF THE PREFERRED EMBODIMENTS

Figure 1:
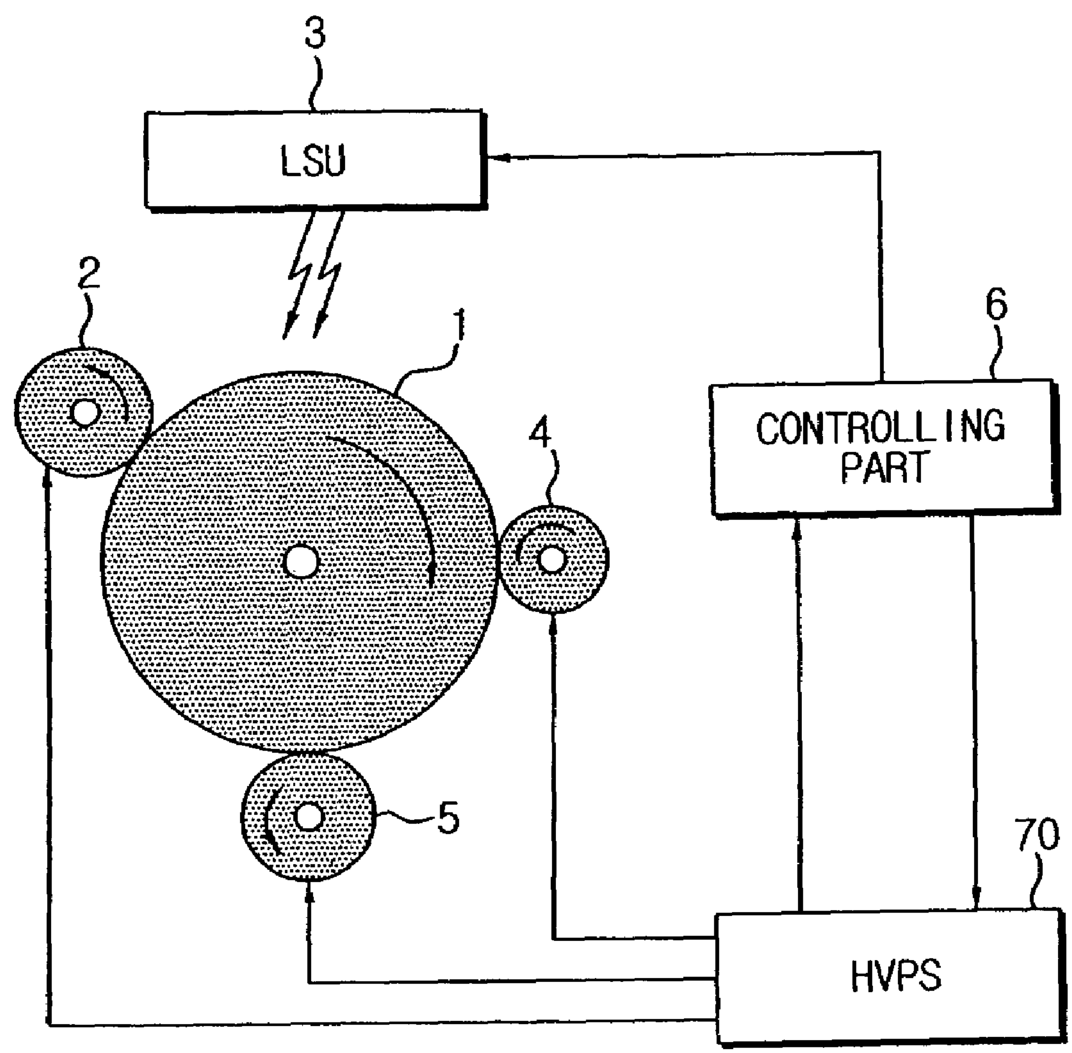
FIG. 1 is a schematic view illustrating a conventional image forming apparatus.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

An apparatus to generate a high voltage according to an embodiment of the present general inventive concept includes a combination of conventional analog devices and has one ASIC (Application Specific Integrated Circuit) chip based on a digital control to control a first (primary) coil of a power transforming part. The ASIC chip can drive four channels according to an embodiment of the present general inventive concept.

Figure 3:
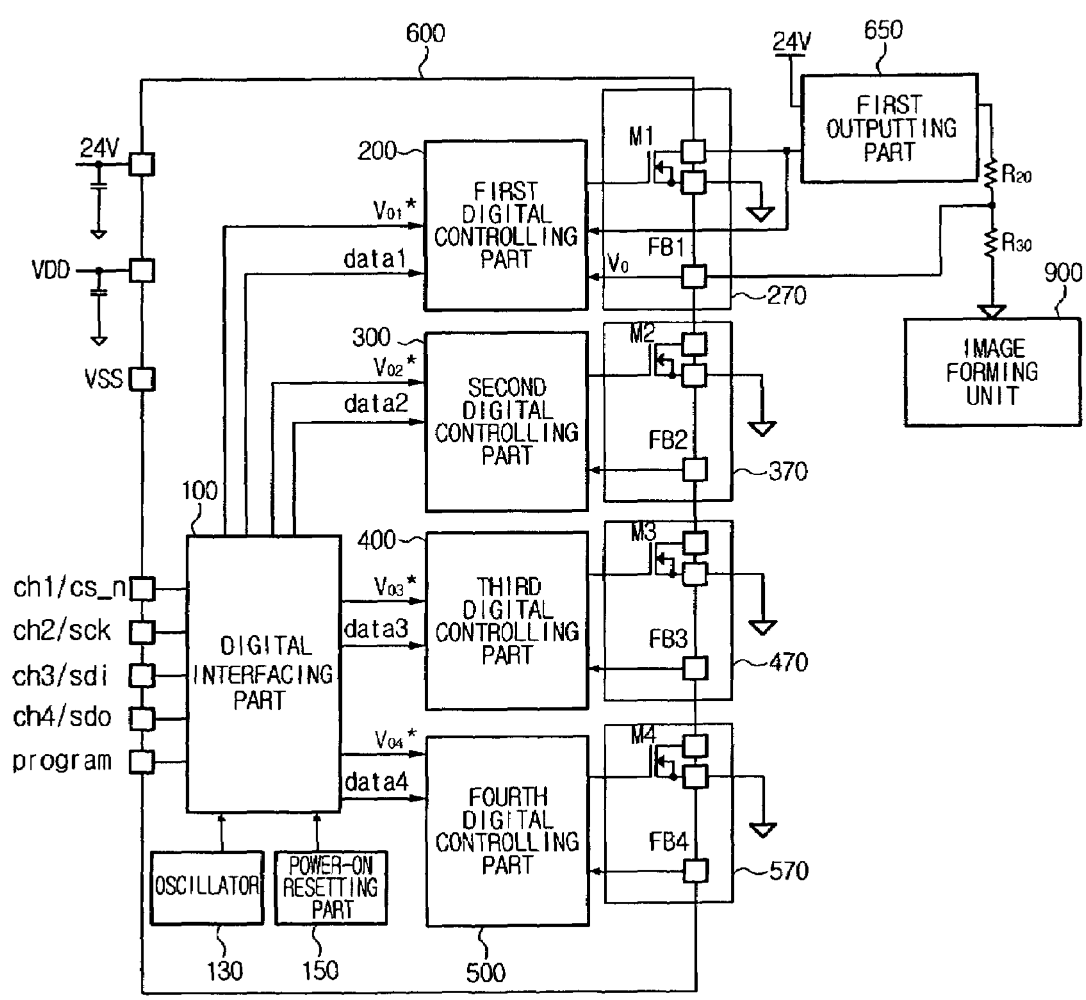
FIG. 3 is a block diagram illustrating an apparatus to generate a high voltage according to an embodiment of the present general inventive concept.

FIG. 3 is a block diagram illustrating an apparatus to generate a high voltage according to an embodiment of the present general inventive concept. Referring to FIG. 3, the apparatus has a semiconductor chip or an integrated circuit chip, such as an ASIC chip 600. The high voltage generated from the apparatus of FIG. 3 can be used to charge an image forming unit 900, such as a drum 1, a developer roller 4 and a transfer roller 5 of FIG. 1. In FIG. 3, the ASIC chip 600 includes a digital interfacing part 100, an oscillator 130, a power-on setting part 150, first through fourth digital controlling parts 200, 300, 400 and 500, and first through fourth switching parts 270, 370, 470 and 570. The first through fourth switching parts 270, 370, 470 and 570 are connected to corresponding ones of first through fourth outputting parts each provided with a power transforming part and a power dividing part, respectively. FIG. 3 illustrates the first outputting part 650 connected to the first switching part 270 for convenience. The second, third, and fourth outputting parts can be connected to the second, third, fourth switching parts 370, 470 and 570, respectively, to provide voltages to the image forming unit 900.

The digital interfacing part 100 receives control data to determine a level of an output voltage from an external engine controlling part. The control data may include a Pulse Width Modulation (PWM) signal having the level of the output voltage decided by a duty ratio thereof. The digital interfacing part 100 may communicate with the external engine controlling part to receive the control data by various methods of communication interfacing through the terminals 'ch1/cs_n,' 'ch2_sck,' 'ch3/sdi,' 'ch4/sdo,' etc. The various methods of communication interfacing include an Universal Asynchronous Receiver/Transmitter (UART), and a serial communication interface, such as a Serial Peripheral Interface (SPI) to exchange data between two apparatuses in serial communication, and $I^2C$ which is a bi-directional serial bus.

The digital interfacing part 100 converts the control data input from the external engine controlling part into one or more predetermined formats and transmits the converted control data to the first through fourth digital controlling parts 200, 300, 400 and 500, respectively to be used as time constants (data 1, data 2, data 3, and data 4) to determine a wave form of the output voltage and as control reference values ($V_{01}$*, $V_{02}$*, $V_{03}$*, and $V_{04}$*) to determine levels of the output voltages.

The first through fourth digital controlling parts 200, 300, 400 and 500 may have similar structure and function. The control reference values ($V_{01}$*, $V_{02}$*, $V_{03}$*, and $V_{04}$*) transmitted from the digital interfacing part 100 are compared with a feedback signal ($V_0$) having an actual output voltage of each channel detected and fed back from the respective outputting part using resistances $R_{20}$ and $R_{30}$. The result of the comparison is used to generate a driving signal of the switching device corresponding to the first through fourth switching parts 270, 370, 470 and 570.

The ASIC chip 600 may include the first through fourth switching parts 270, 370, 470 and 570 each using a Metal Oxide Semiconductor Field Effect Transistor (MOSFET) (M1, M2, M3, and M4) as the switching device. The first through fourth switching parts 270, 370, 470 and 570 provide a controlled voltage to the first coil of the power transforming part serially connected to a drain of the MOSFET, by supplying the driving signal output by the first through fourth digital controlling parts 200, 300, 400 and 500, to a gate of the MOSFET Since the MOSFET is used as a switching device, a heat sink to dissipate heat generated by a transistor may not be necessary in the present embodiment.

The first outputting part 650 includes the power transforming part, a power dividing part and a rectifying part. The power transforming part is serially connected to the switching device 270, and resonates according to an on and off operation of the switching device 270, to generate an AC signal which may be used to control components of the image forming apparatus. Accordingly, a second (secondary) coil of the power transforming part is induced with the AC signal (or AC voltage) having a high electric potential. The power dividing part and the rectifying part rectify the AC voltage induced in the second coil of the power transforming part according to a range of an output voltage to control the components of the image forming apparatus, or boost the AC voltage through distributing circuit, to be used for the final output voltage. A feedback signal FB1 may be supplied to the first digital controlling part 200 to control the first digital part 200. Similarly, feedback signals FB2, FB3, and FB4, may be supplied to the second, third and fourth digital controlling parts 300, 400 and 500, respectively. The ASIC chip 600 includes the oscillator 130 which is a clock generator and the power-on setting part 150, and is supplied with 24V for high voltage supply and VDD for IC driving.

The first through fourth outputting parts are controlled according to the control data received from the external engine controlling part, such that high voltages are generated.

Figure 4:
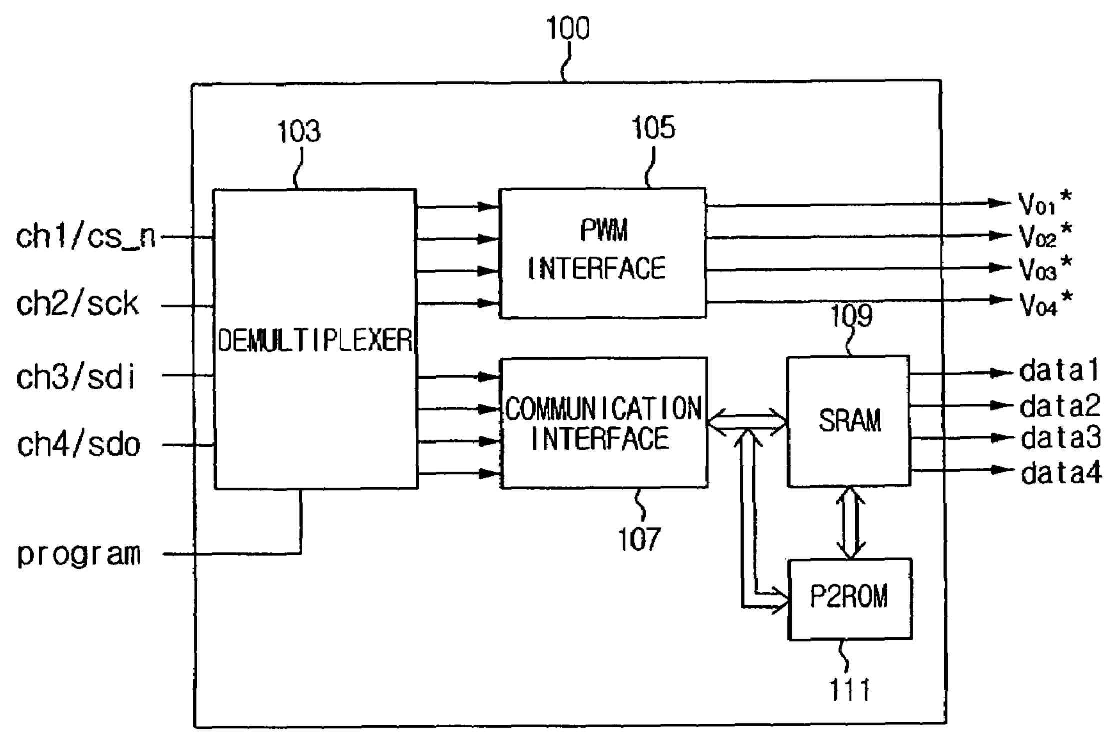
FIG. 4 is a block diagram illustrating a digital interfacing part of the apparatus of FIG. 3.

FIG. 4 is a block diagram illustrating the digital interfacing part 100 of the apparatus of FIG. 3. Referring to FIGS. 3 and 4, the digital interfacing part 100 includes a demultiplexer 103, a PWM interface 105, a communication interface 107, a Static Random Access Memory (SRAM) 109, and a Production-Programmed Read-Only memory (P2ROM) 111.

The demultiplexer 103 transmits a signal input through terminals 'ch1/cs_n,' 'ch2/sck,' 'ch3/sdi,' and 'ch4/sdo' to at least one of the PWM interface 105 and the communication interface 107, according to a signal input to a 'program' terminal. That is, when a low signal is input to the 'program' terminal, the signal input through the 'ch1/cs_n,' 'ch2/sck,' 'ch3/sdi,' and 'ch4/sdo' terminals is transmitted to the PWM interface 105, and when a high signal is input to the 'program' terminal, the signal input through the ch1/cs_n', 'ch2/sck', 'ch3/sdi', and 'ch4/sdo' terminals is transmitted to the communication interface 107.

The PWM interface 105 receives control reference values used to determine levels of output voltages as the control data in a PWM format from a controlling part. That is, the PWM interface 105 calculates for each high voltage channel a duty width of a pulse representing the control data in the PWM format and the level of the output voltage in the respective high voltage channel is decided according to a duty ratio, based on a clock signal reference pulse width provided from the oscillator 130. The oscillator 130 may be disposed inside the ASIC chip 600 (see FIG. 3). The PWM interface 105 outputs the control reference value of the respective high voltage channel (e.g., $V_{01}$*) in a digital data format. A separate synchronization circuit may be added to remove ripples occurred due to jitter between the input PWM signal and the clock signal. The control reference value (e.g., $V_{01}$*) is used as a reference value to determine the level of the output voltage in feedback control, so that an off operation can be performed when a width of the input PWM signal is 100%, while a MAX (maximum) voltage can be output to perform an on operation when the width of the PWM signal is 0%. In open loop controls, 'MAX' voltage is output independently from the input signal.

The communication interface 107 receives the control data from the external engine controlling part according to various serial communication methods, in a programming mode when the high signal is input into the 'program' terminal.

The various serial communication methods may include an Universal Asynchronous Receiver/Transmitter (UART), a Serial Peripheral Interface (SPI) enabling exchanges of data between two apparatuses in serial communication and $I^2C$ which is a bi-directional serial bus. The control data transmitted from the communication interface 107 is stored at the SRAM 109, and used to set the time constant of an output voltage compensator in the first digital controlling part 200 (see FIG. 3).

The communication interface 107 is connected to the P2ROM 111, which is a fuse-array having the same memory mapping as the SRAM 109, and permanently stores a tuning-ended time constant of the output voltage compensator. Similarly, if a multifunction interface is applied, multifunctional operations are performed with a limited number of input and output terminals, and the ASIC 600 becomes compact-sized.

Figure 5:
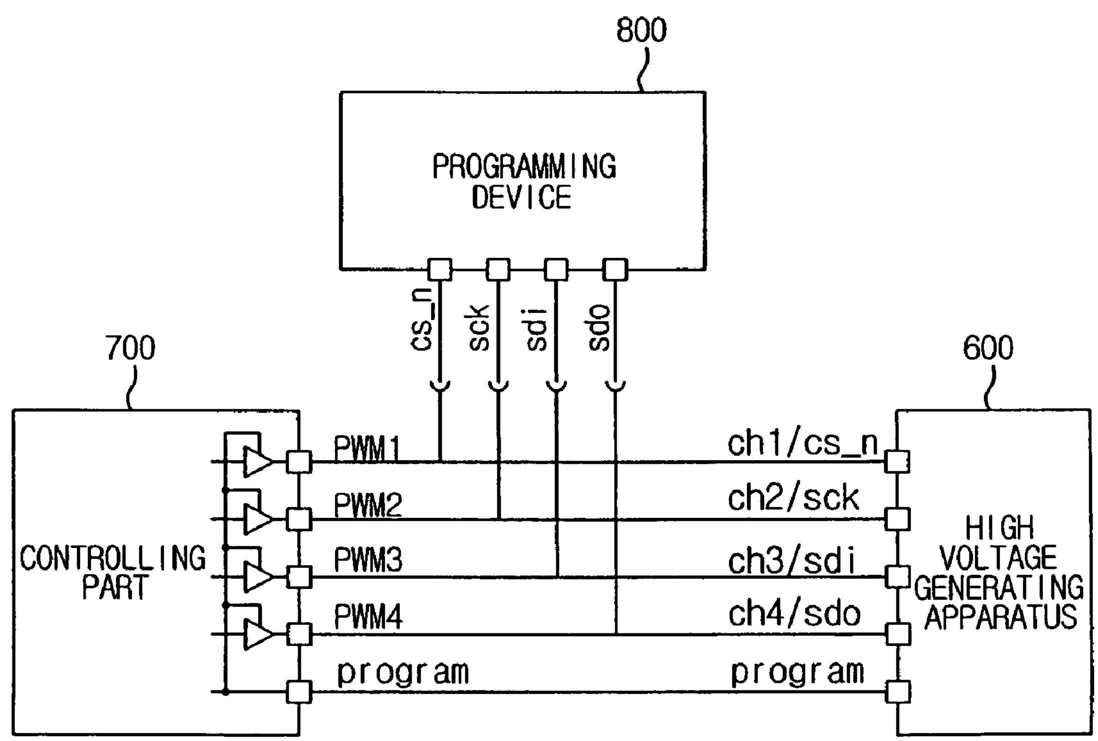
FIG. 5 illustrates a control system having connections among the apparatus of FIG. 3 to generate the high voltage, a controlling part, and a programming device according to an embodiment of the present general inventive concept.

FIG. 5 illustrates a system having connections among the apparatus 600 of FIG. 3, a controlling part 700, and a programming device 800 according to an embodiment of the present general inventive concept. As illustrated in FIGS. 3 through 5, PWM output terminals PWM1, PWM2, PWM3, and PWM4 of the controlling part 700 are connected to control the terminals ch1/cs_n, ch2/sck, ch3/sdi, and ch4/sdo of the apparatus 600, respectively. A 'program' terminal of the controlling part 700 is connected to the 'program' terminal of the apparatus 600. By this connection, the controlling part 700 may control output voltage of four channels through the PWM output terminals PWM1, PWM2, PWM3, and PWM4. As illustrated in FIG. 5, according to a programming mode, the programming device 800 external to the apparatus 600 may be connected parallel to the controlling part 700. The controlling part 700 maintains a high impedance state in order to prevent data errors. If the controlling part 700 has bi-directional I/O structures supporting a 'Tri-State,' the controlling part 700 sends the PWM output during a controlling mode through direct mode conversions, while directly varying and storing the time constant during the programming mode.

Command codes used during the programming mode include 'Write,' 'Read,' 'Load,' and 'Fuse,' and [Table 1] below illustrates details of the command codes.

TABLE 1

| Command | Code(binary) | | | | | | | | Description |
|---|---|---|---|---|---|---|---|---|---|
| Write | 0 | 0 | 0 | 0 | $a_3$ | $a_2$ | $a_1$ | $a_0$ | WRITE data to SRAM |
| Read | 0 | 0 | 0 | 1 | $a_3$ | $a_2$ | $a_1$ | $a_0$ | READ data from SRAM |
| Load | 0 | 0 | 1 | 0 | — | — | — | — | LOAD data from fuse array into SRAM |
| Fuse | 0 | 0 | 1 | 1 | — | — | — | — | FUSE data from SRAM into poly fuse array |

According to a 'Write' command, the time constant received as data from the programming device 800 is stored in the SRAM 109, and when consecutive data are stored, a storing address in the SRAM 109 automatically increases. According to a 'Read' command, the time constant stored in the SRAM 109 is read by the external programming device 800 and may be used to verify the data stored in the SRAM 109.

According to a 'Load' command, mapping the data permanently stored in a fuse array, for example, the P2ROM 111 in the SRAM 109 data can be transmitted and received through the communication interface 107 so that the data is copied between the P2ROM 111 and the SRAM 109. The 'Load' and 'Read' commands may be used to verify the data stored in the P2ROM 111.

A 'Fuse' command is used to permanently store in a poly fuse array, for example, the P2ROM 111 the data stored in the SRAM 109 according to the 'Write' command, and during a resetting operation, the data stored in the P2ROM 111 is copied to the SRAM 109 and may be used to perform a controlling function.

Since even if the data is stored not in the P2ROM 111 but in the SRAM 109 according to the 'Write' command, an output voltage control loop is normally operated, it is possible to perform tuning without loss of the P2ROM 111 by simply programming the time constant for tuning. The high voltage generating apparatus may comprise a memory to store the first data and a P2ROM to store reference data to verify the first data.

Figure 2:
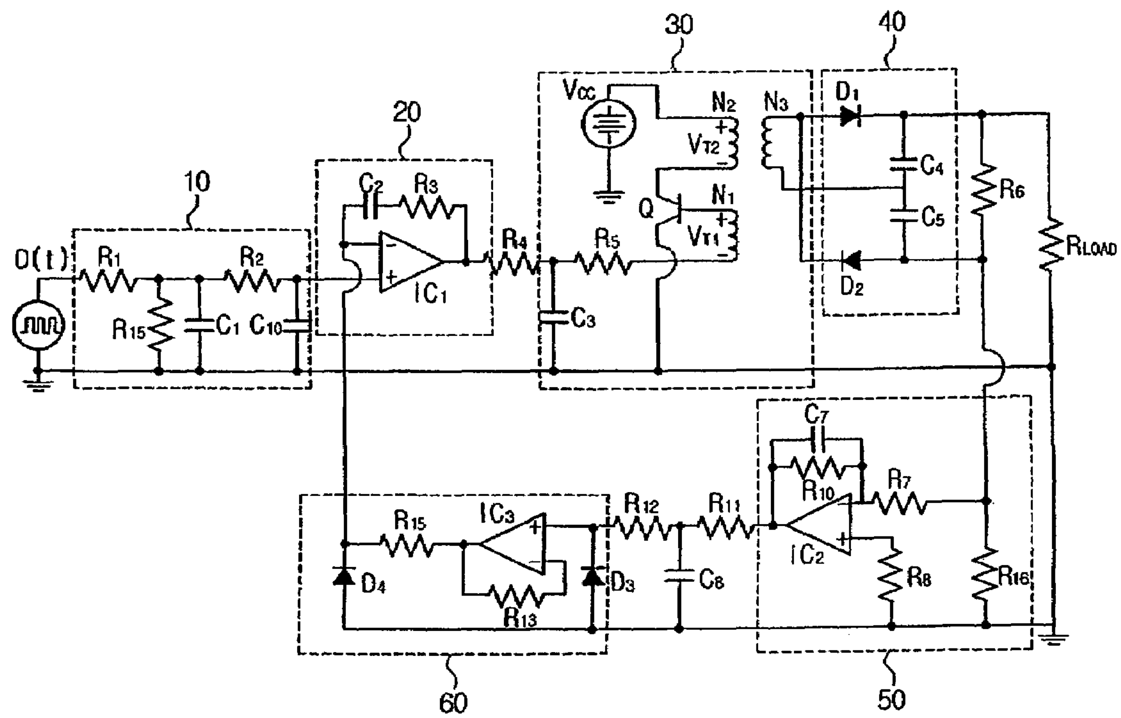
FIG. 2 is a circuit block diagram illustrating a conventional apparatus of generating a high voltage.

In each of the digital controlling parts 200, 300, 400, and 500 may be embodied a structure to perform a control function using an RC filter and operational amplifier which are used in a conventional apparatus of FIG. 2 to generate a high voltage According to the present embodiment, the embodied structures of the ASIC chip 600 actively copes with variance of a load connected to any of the first through fourth outputting parts 650. The structure of the apparatus to generate the high voltage may be further simplified by including the switching devices in ASIC chip.

Because an ASIC chip enables to output four or more channels, multi-output may be possible by using a plurality of ASIC chips in image forming apparatuses, for example, a Mono LBP and a Tandem C-LBP.

As above described, according to various embodiments of the present general inventive concept, it is possible to reduce the number of parts and to achieve compactness of the apparatus to generate a high voltage usable with an image forming apparatus, by having a one ASIC chip using a digital control method. Functionality of the image forming apparatus is expanded by using control data received by various methods of communication interfacing such as SPI, UART or 12C.

By controlling a variable value, such as a proportional gain used for the digital controlling part in the ASIC chip with a program provided from an external programming device, embodiments of the apparatus to generate a high voltage achieve an easy optimum control according to an output state, and increased flexibility. The efficiency of mass production is increased by reducing the time needed for tuning each parameter and by including the MOSFET used as a switching device in the ASIC chip, heat-generation problems of the conventional HVPS are overcome.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus to generate a high voltage, comprising: a switching part to interrupt a current to be supplied to a primary coil of a power transforming part to control an output voltage to be induced to a secondary coil of the power transforming part;

a digital controlling part to control the switching part according to a time constant determining a wave form of the output voltage of the power transforming part and a control reference value determining a level of the output voltage; and a digital interfacing part to convert input control data having first and second formats into the time constant and the control reference value, respectively, and to provide the control reference value and the time constant to the digital controlling part.

2. The apparatus of claim 1, wherein the input control data in the second format comprises a PWM signal, and the input control data in the first format is transmitted through a serial communication interface.

3. The apparatus of claim 2, wherein the digital interfacing part comprises:

a PWM unit to convert the input control data in the second format into the control reference value and to output the control reference value;

a communication interface including the serial communication interface;

a memory to store and output the time constant through the communication interface; and a demultiplexer to receive the input control data through either the PWM interface or the communication interface.

4. The apparatus of claim 3, wherein the memory comprises:

a volatile memory to store the time constant; and a programmable non-volatile memory having the same memory map as the volatile memory to store the time constant.

5. The apparatus of claim 3, wherein the serial communication interface is one of an SPI, a UART and an $I^2C$.

6. The apparatus of claim 1, wherein the switching part, the digital interfacing part and the digital controlling part, are disposed in a single chip.

7. The apparatus of claim 1, wherein the digital controlling part receives the output voltage of the power transforming part as a feedback signal and modulates a cycle of the interruption operation of the switching part according to a comparison between the feedback signal and the control reference value.

8. The apparatus of claim 1, wherein the switching part comprises a MOSFET to perform the interruption operation.

9. An image forming apparatus comprises:

an outputting part having a power transforming part formed with a primary coil and a secondary coil;

a switching part to control an output voltage induced in the secondary coil of the power transforming part, by interrupting a current in the primary coil of the power transforming part;

a digital controlling part to control the interruption operation of the switching part according to a time constant deciding a wave form of the output voltage of the power transforming part and a control reference value deciding a level of the output voltage; and a digital interfacing part to convert input control data having first and second formats into the time constant and the control reference value, respectively, and to provide the time constant and the control reference value to the digital controlling part.

10. A method of generating a high voltage, the method comprising:

converting input data having first and second formats into a time constant determining an output voltage of a power transforming part and a control reference value determining a magnitude of the output voltage, respectively;

controlling a switching operation of a predetermined switching device according to the time constant and the control reference value; and modulating an output voltage induced in a secondary coil of the power transforming part, by interrupting a current in a primary coil of the power transforming part, according to the switching operation.

11. The method of claim 10, further comprising:

receiving the output voltage of the secondary coil of the power transforming part as a feedback signal, and modulating a cycle of the switching operation according to a comparison between the feedback signal and the control reference value.

12. The method of generating high voltage of claim 11, wherein the method is performed in a single chip.

13. The method of claim 10, wherein the input data in the second format comprises a PWM, and the input data in the first format are transmitted through a serial communication interface.

14. The method of generating high voltage of claim 10, wherein the switching part comprises a MOSFET.

15. An ASIC (Application Specific Integrated Circuit) chip provided on one semiconductor substrate to control an outputting part to generate a high voltage, the ASIC chip comprising:

a switching device to interrupt a current in a primary coil of a power transforming part to control an output voltage induced in a secondary coil of the connected transforming part;

a digital controlling part to control an interruption operation of the switching part according to a time constant determining a wave form of the output voltage of the secondary coil of the power transforming part and a control reference value determining a level of the output voltage; and a digital interfacing part to convert input data having first and second forms into the time constant and the control reference value, respectively, and to provide the time constant and the control reference value to the digital controlling part.

16. The ASIC chip of claim 15, further comprising:

a feedback circuit part to receive the output voltage of the secondary coil of the power transforming part as a feedback signal and to modulate a cycle of the interruption operation of the switching part according to a comparison between the feedback signal and the control reference value.

17. The ASIC chip of claim 15, wherein the input data having the second form comprises a PWM signal and the input data in the first form is transmitted through a serial communication interface.

18. The ASIC chip of claim 15, wherein the switching part comprises a MOSFET.

19. An apparatus to generate a high voltage, comprising:

a programming device to generate first data;

a controlling part to generate second data; and a high voltage generating apparatus connected to the programming device and to the controlling part to generate a high voltage having a first character and a second character determined according to the first data and the second data, respectively, wherein the controlling part generates a controlling mode signal and a program mode signal, and the high voltage generating apparatus selectively receives one of the first data and the second data according to the controlling mode signal and the program mode signal.

20. The apparatus of claim 19, wherein the high voltage generating apparatus comprises:

a single monolithic semiconductor to generate a switching signal according to the first data and the second data; and an output part having a primary coil to receive the switching signal and a secondary coil to generate an output signal corresponding to the high voltage according to the switching signal.

21. The apparatus of claim 20, wherein the single monolithic semiconductor compares the second data with feedback data of the output part to generate the switching signal.

22. The apparatus of claim 20, wherein the single monolithic semiconductor comprises at least one of an SRAM and a P2ROM to store the first data.

23. The apparatus of claim 19, wherein the high voltage generating apparatus comprises a memory to store the first data and a P2ROM to store reference data to verify the first data.

24. An apparatus to generate a high voltage, comprising:

a programming device to generate first data;

a controlling part to generate second data; and a high voltage generating apparatus connected to the programming device and to the controlling part to generate a high voltage having a first character and a second character determined according to the first data and the second data, respectively, wherein the programming device comprises first terminals, the controlling part comprises second terminals and a program terminal, and the high voltage generating apparatus comprises third terminals commonly connected to corresponding ones of the first terminals and the second terminals to receive the first data and the second data, respectively, and a second program terminal connected to the program terminal to receive a mode signal to selectively receive the first data and the second data through the third terminals.

25. An apparatus to generate a high voltage, comprising:

a programming device to generate first data;

a controlling part to generate second data; and a high voltage generating apparatus connected to the programming device and to the controlling part to generate a high voltage having a first character and a second character determined according to the first data and the second data, respectively, wherein the high voltage generating apparatus comprises:

a monolithic semiconductor having one or more common terminals connected to terminals of the programming device and the controlling part to selectively receive the first data and the second data from the programming device and the controlling part, and one or more digital controlling parts to generate a switching signal according to the first data and the second data; and an output part to generate high voltage according to the switching signal.

26. The apparatus of claim 25, wherein the monolithic semiconductor comprises:

a PWM interface to output a control reference value according to the second data; and a communication interface to output a time constant corresponding to the second data, wherein the digital controlling part generates the switching signal according to the control reference value and the time constant.

27. The apparatus of claim 25, wherein the monolithic semiconductor comprises a SRAM to store the first data, and a P2ROM to store reference data.

28. The apparatus of claim 27, wherein the reference data is used to map the SRAM according to a characteristic of the first data.

* * * * *

UNITED STATES PATENT AND TRADEMARK OFFICE

CERTIFICATE OF CORRECTION

PATENT NO. : 7,619,399 B2
APPLICATION NO. : 11/407031
DATED : November 17, 2009
INVENTOR(S) : Cho et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 567 days.

Signed and Sealed this

Twenty-sixth Day of October, 2010

David J. Kappos

*Director of the United States Patent and Trademark Office*